Feb. 14, 1939.  T. STREM  2,146,920
PHOTOGRAPHIC PLATE IDENTIFYING APPARATUS
Filed Aug. 4, 1937  3 Sheets-Sheet 1

Inventor
THOMAS STREM

By Knight Bros.
Attorney

Feb. 14, 1939.                T. STREM                    2,146,920
                 PHOTOGRAPHIC PLATE IDENTIFYING APPARATUS
                 Filed Aug. 4, 1937        3 Sheets-Sheet 2
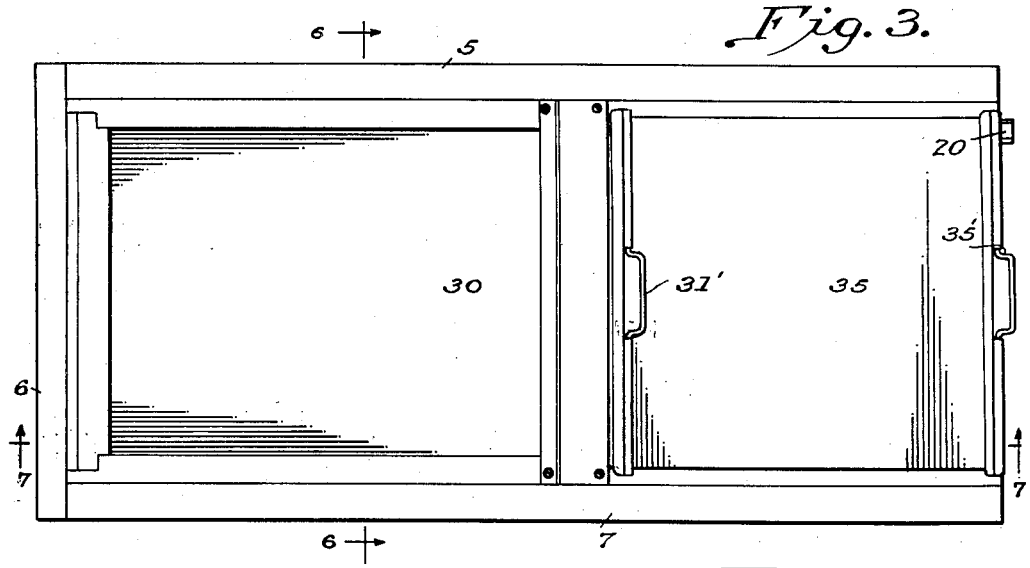
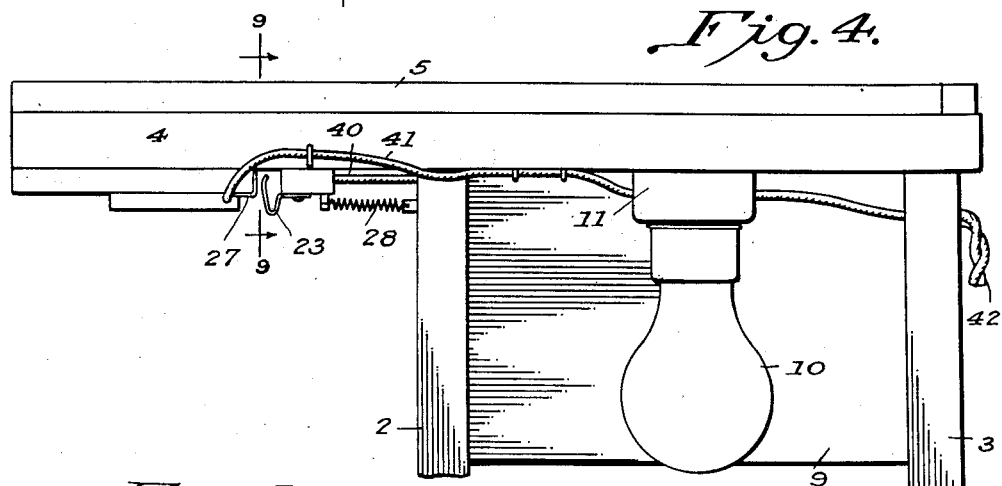
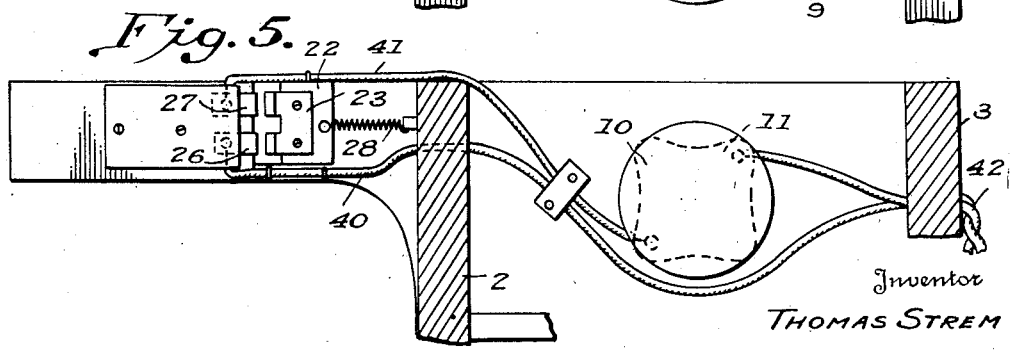
Inventor
THOMAS STREM
By Knight Bros.
Attorney Feb. 14, 1939.  T. STREM  2,146,920
PHOTOGRAPHIC PLATE IDENTIFYING APPARATUS
Filed Aug. 4, 1937  3 Sheets-Sheet 3
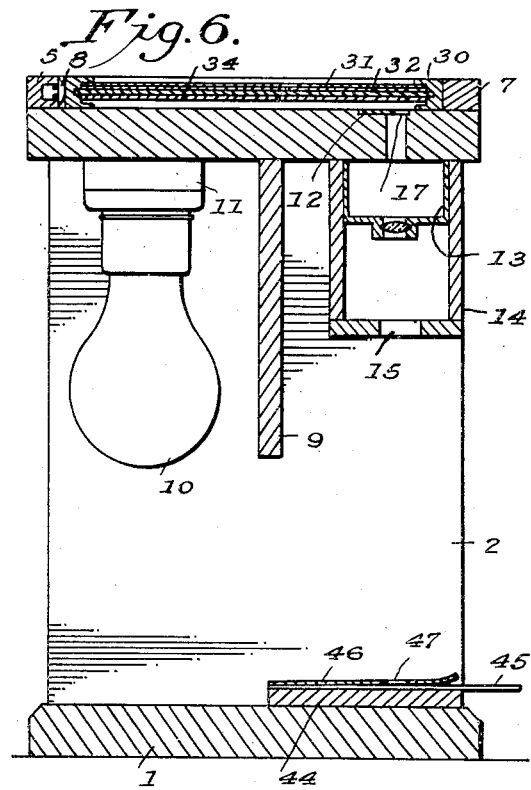
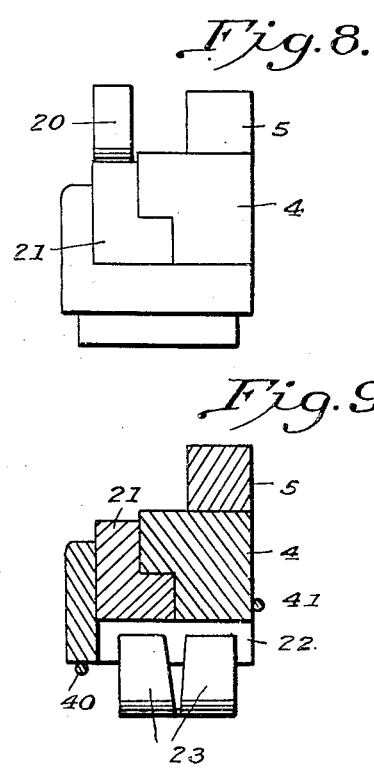
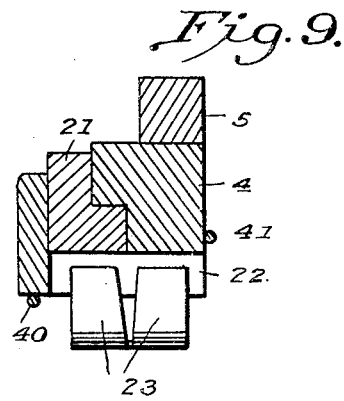
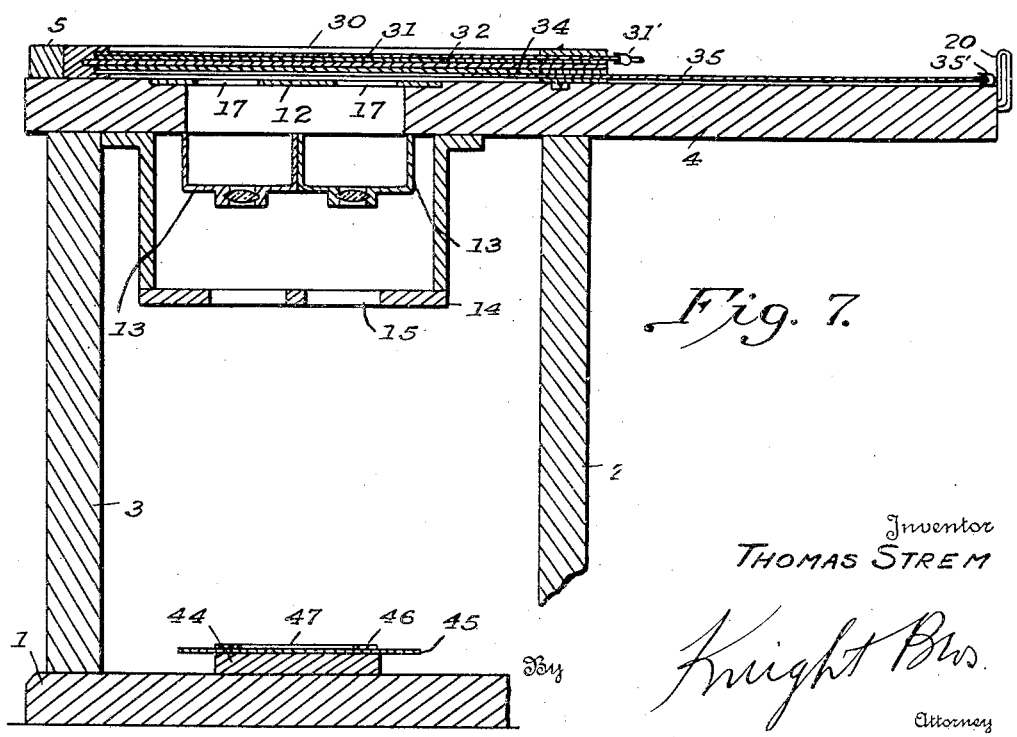
Inventor
THOMAS STREM
Knight Bros.
Attorney Patented Feb. 14, 1939

2,146,920

UNITED STATES PATENT OFFICE 2,146,920

PHOTOGRAPHIC PLATE IDENTIFYING APPARATUS

Thomas Strem, Pittsburgh, Pa.

Application August 4, 1937, Serial No. 157,420

4 Claims. (Cl. 95—1.1)

This invention relates to an apparatus for recording identifying data upon photographic plates following their exposure.

It is an object of the invention to provide an apparatus enabling the impression of identifying data upon photographic plates immediately following their exposure and prior to their development in order to properly identify the developed negative with other records appurtenant to the subject which has been photographed.

It is a further object of the invention to provide an apparatus which may be operated outside of the dark room, thereby eliminating a frequent source of error in the marking of exposed photographic plates with identifying characters.

It is a further object of the invention to provide an apparatus embodying a camera device for the purpose of rapidly photographing upon one or more unexposed margins of the photographic plate the identifying data without affecting the previously exposed portions of the photographic plate. This impression upon the photographic plate may be accomplished automatically by a simple to-and-fro movement of the shielding screen for the photographic plate.

Figure 1:
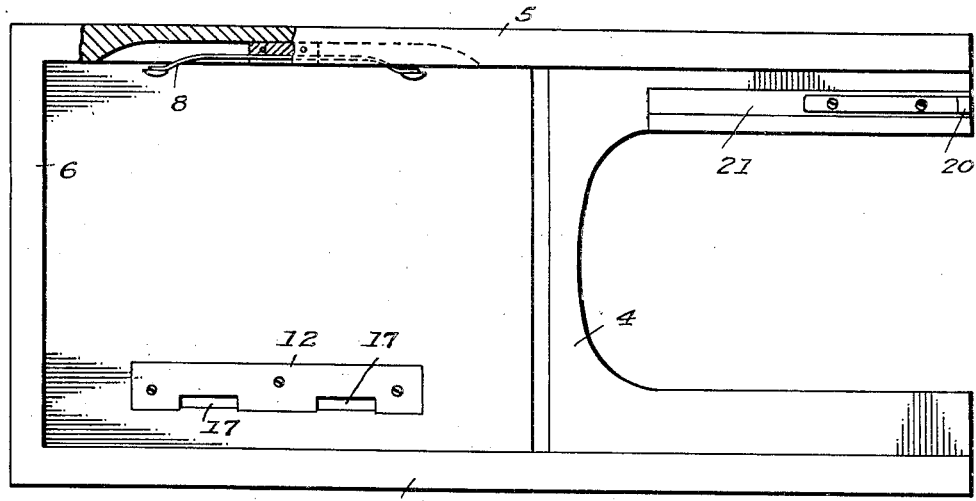
Figure 2:
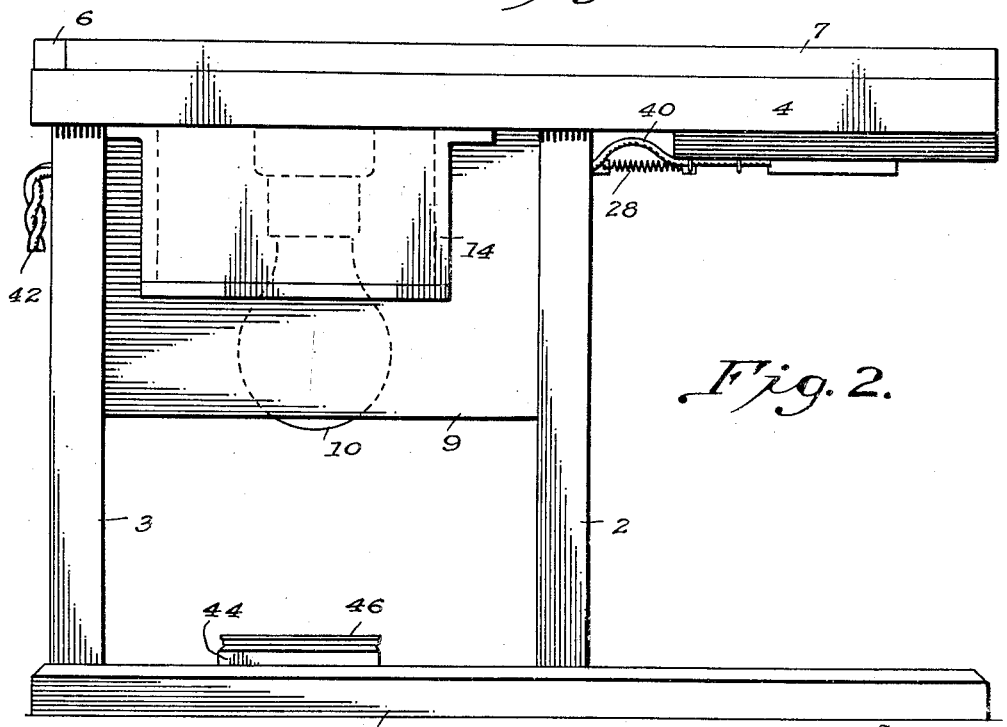

Other objects and purposes will appear from a more detailed description of the invention following hereinafter taken in conjunction with the accompanying drawings, wherein, Figure 1 is a plan view of my apparatus, Figure 2 is a front view thereof, Figure 3 is a plan view of my apparatus showing the photographic plate assembly in place at the time of obtaining an exposure of the identifying data, Figure 4 is a rear elevation of the upper portion of the apparatus, Figure 5 is a bottom view of Figure 4, Figure 6 is a transverse sectional view along line 6—6 of Figure 3, Figure 7 is a longitudinal sectional view along line 7—7 of Figure 3, Figure 8 is a right end view of a detail of Figure 1, and, Figure 9 is a transverse sectional view along line 9—9 of Figure 4.

In the drawings, my apparatus may be formed of a supporting platen 4 for a photographic plate assembly which may be mounted upon a base 1 through the intermediary of vertical supports 2 and 3. Three sides of the platen 4 may be framed by marginal rims 5, 6 and 7 which serve to confine the photographic plate assembly upon the platen 4 and render the underportion of the platen light-tight. A spring retaining device 8 may be incorporated in one of the rims, such as 5, in order to maintain the assembly tightly in place. It is understood that the platen 4 and the confining frame may be altered to suit various sizes of plate assemblies.

In the illustrated embodiment of the invention, a holder for a ticket 45 carrying printed matter for identifying the exposed photographic plates is mounted upon the base 1. The holder may be formed of a support 44 covered with a retaining strip 46 having an aperture 47 through which may appear the desired information, such as "WASH. 3342", or any other desirable data. This data appearing upon the margin of the negatives and the printed proofs will indicate that this set of proofs comes from Washington and is identified by the records in the latter city by No. 3342. Thus all possibilities of confusing the photographs with any others from other cities or identification by other numbers are excluded.

In the use of the invention with photographic plates having two exposures upon each face, the plate assembly is formed of a frame 30 (Figures 6 and 7) confining the sensitive plates 32 and 34 each of which is screened by a protective screen 31 and 35 respectively. The screens 31 and 35 are reciprocable in the frame in order to alternately shield and expose its respective plate. In the course of exposing the plates 32 and 34 small margins are left unexposed in order to provide room for the identification data as applied in accordance with the present invention. For the purpose of exposing the identifying data upon such margins, the platen 4 is provided with two apertures 17 which may be framed by a member 12 upon the top of the platen 4 for the purpose of exposing the identifying data upon each of the two portions of the photographic plate. It is understood that in the event that the plate is exposed but once, a single aperture will suffice.

A pair of camera devices 13 mounted within a casing 14 provided with apertures 15 are mounted upon the underside of the platen 4 and serve to photograph the identifying data upon the ticket 45 onto the unexposed margins of the plates 32 and 34 upon the withdrawal of the respective screens 31 and 35. In order to accomplish this photographic operation without unduly complicating the camera structures, the exposure is controlled by the energization of a light source 10 in response to the withdrawal of the shielding screens in order to obtain a momentary exposure upon the margins of the photographic plate. Thereupon the shielding screen is immediately returned to its screening position, wherein it shields the previously exposed photograph as well as the identifying data.

A partition 9 may be disposed between the light source 10 and the camera device 13 so that the light source 10 will effectively illuminate the identifying data on the ticket 45 for exposure by the camera without causing a glare therein. The means for energizing the light source 10 automatically in response to the withdrawal movement of either one of the shielding screens 31 or 35 is described below.

The light source which may be a conventional 40 watt lamp bulb may be energized from a conventional source of current by way of lamp cord 42, the circuit of which is normally broken by the conductors 40 and 41 at stationary contacts 26 and 27 respectively, which are mounted upon the underside of the platen 4 at one side thereof. A slidable actuator 21 is provided with a contact 23 at one end thereof adapted to bridge the contacts 26 and 27. At the opposite end thereof it is provided with an upturned member 20 which is disposed in the path of movement of the shielding screens 31 and 35. At the conclusion of the withdrawal movement of either one of these screens by means of handles 31' and 35' respectively, the edge of one of the screens strikes the upstanding element 20 and causes it to move to the right as shown in Figure 1, thereby bringing the contact 23 into pressing relationship with contacts 26 and 27 which closes the circuit of the lamp, providing sufficient light to illuminate the ticket 45 in order to expose the data thereupon onto the margin of the photographic plate which is presently exposed by virtue of the fact that the lowermost screen is in withdrawn position. This exposed light does not affect the portion of the photographic plate which was previously exposed in the course of taking the one or more pictures for the reason that the plate is resting upon the solid platen 4 which is only apertured at 17. Upon the completion of this momentary exposure, the operator slides the shielding screen back into the protecting position. When this occurs, a spring 28 extending between the rear end of the actuator 21 and the frame member 2 retracts the switch 23 in order to break the circuit of the light source to bring the parts back into their original position.

The plate assembly 30 may now be turned upon its opposite face and upon the withdrawal of the other shielding screen, the marginal edge of the opposite photographic plate is exposed with the identifying data on ticket 45.

Thus the exposed plates have impressed upon them identifying data in conjunction with photographs thereupon appurtenant to the former which unmistakably identify them so that the possibility of errors in the course of development of the plates are definitely excluded since each negative and the proofs made therefrom will bear identifying data adjacent the respective photographs.

In the preferred embodiment of the invention, the planar support for the photographic plate assembly may be lined with velvet, plush or any other smooth material in order to make the support light-tight and in order to prevent damage to the plates.

The essence of the invention disclosed herein may be adapted to other applications wherein the same problems for identifying exposures arise. While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. In a device of the class described, a support for an exposed photographic plate embodying a protective slidable screen for the plate assembly and having an aperture at one side thereof, a holder for identifying data appurtenant to the exposed plate displaced from said support in optical alignment with said aperture, a light source for illuminating said holder, and switch means for energizing said light source in response to the withdrawal movement of said protective screen whereby an exposure of the identifying data upon the margin of the photographic plate may be effected.

2. In a device of the class described, a platen support for an exposed photographic plate assembly having an unexposed margin on the photographic plate adapted to receive identifying data appurtenant to the exposure thereupon and embodying a shielding slidable screen for the plate, said support having an aperture at one side thereof in alignment with said unexposed margin, a holder for the identifying data displaced from said support in optical alignment with said aperture, an electric light source for illuminating said holder, and switch means for momentarily energizing said light source in response to a to-and-fro movement of said shielding screen whereby an exposure of the identifying data upon the margin of the photographic plate may be effected.

3. In a device of the class described, a light-tight platen support for the underportion of an exposed photographic plate assembly having an unexposed margin on the photographic plate adapted to receive identifying information appurtenant to the exposure thereupon and embodying a shielding slidable screen for the plate, said support having an aperture at one side thereof in alignment with said unexposed margin, a holder for the identifying information below said support in optical alignment with said aperture, a camera mounted below said support between the bearer of identifying information and the aperture, adapted to expose the identifying information upon the marginal edge of the photographic plate upon the removal of the shielding screen from behind the aperture, an electric light source for illuminating said holder for the identifying data, a partition for excluding the light from said source from shining directly into said camera, and switch means for momentarily energizing said light source at the conclusion of the withdrawal movement of said slidable screen for exposing the identifying information upon the margin of the photographic plate without affecting the photographic exposure thereupon.

4. In an apparatus of the class described, a planar light-tight support for a photographic plate assembly including a plate having two exposures thereupon with an unexposed margin, said support having a pair of apertures below said margin one each in the field of said exposures, a slidable shielding screen for said plate, a camera device below each aperture, a holder for printed data identifying the exposures on the photographic plate below said cameras, an electric light source for illuminating said holder, and switch means for energizing said light source momentarily in response to a momentary exposure of the margin on the photographic plate to the action of the camera device operated by the withdrawal movement of said shielding screen.

THOMAS STREM.